United States Patent [19]
Moriyama et al.

[11] Patent Number: 5,142,377
[45] Date of Patent: Aug. 25, 1992

[54] TIME BASE CORRECTION APPARATUS

[75] Inventors: Yoshiaki Moriyama; Toshio Mikami, both of Tokorozawa, Japan

[73] Assignee: Pioneer Electronic Corporation, Tokyo, Japan

[21] Appl. No.: 288,825

[22] Filed: Dec. 23, 1988

[30] Foreign Application Priority Data

| Apr. 6, 1988 | [JP] | Japan | 63-84802 |
| Apr. 6, 1988 | [JP] | Japan | 63-84803 |
| Apr. 22, 1988 | [JP] | Japan | 63-100588 |
| Apr. 22, 1988 | [JP] | Japan | 63-100589 |

[51] Int. Cl.⁵ .............................. H04N 9/89
[52] U.S. Cl. ...................... 358/320; 358/17
[58] Field of Search ............. 358/337, 339, 325, 320, 358/324, 326, 323; 360/36.1, 36.2, 38.1

[56] References Cited

U.S. PATENT DOCUMENTS

| 4,090,215 | 5/1978 | Buchan et al. | 358/325 |
| 4,313,129 | 1/1982 | Fukui | 358/325 |
| 4,733,294 | 3/1988 | Wesolowski | 358/325 |
| 4,825,299 | 4/1989 | Okada et al. | 358/323 |
| 4,905,101 | 2/1990 | Ohta et al. | 360/36.2 |
| 4,956,720 | 9/1990 | Tomisawa | 358/325 |

FOREIGN PATENT DOCUMENTS 62-140587 6/1987 Japan.
63-286022 11/1988 Japan.

Primary Examiner—Donald McElheny, Jr.
Attorney, Agent, or Firm—Foley & Lardner

[57] ABSTRACT

A time base correction apparatus includes a feedback loop for performing time base correction of an input signal by detecting a time base error component of the input signal and a filter having an amplitude characteristic approximating an open loop characteristic of the feedback loop for receiving the time base error component. The input signal whose time base error is corrected by the feedback loop is treated by time base correction by a feed forward operation using an output signal of the filter. With this feature, a time base error which was not removed by the feedback loop is further corrected, and an effective time base correction is performed also for high frequencies.

13 Claims, 9 Drawing Sheets

CORRECTION ERROR

TIME BASE CORRECTION APPARATUS

BACKGROUND OF THE INVENTION

1. Field of the Invention

The present invention generally relates to a time base correction apparatus, and more particularly to an apparatus for correcting a time base error of a video signal.

2. Description of Background Information

Time base error is commonly generated in a video signal reproduced by a recorded information reproducing apparatus such as a video disc player or a video tape (or video cassette) recorder (VTR or VCR), which time base error is generated, for example, by a fluctuation of rotation in the mechanical system of the apparatus. Since the time base error is a cause of disturbances such as fluctuation of the picture and color blur or color variation, it is necessary to eliminate or reduce the time base error to as small an amount as possible in the video signal processing circuit.

On the other hand, a video signal reproducing system has been proposed by the applicants of the present application (reference is directed to Japanese Patent Application Laid Open No. 62-140587) in which the reproduced video signal is processed totally in digital form. A conventional time base correction apparatus in this video signal reproducing system will be specifically discussed with reference to FIG. 1.

As illustrated, an FM video signal read-out from a recording medium such as a video disc is supplied to an A/D converter 2 through an analog LPF (low pass filter) 1. The LPF 1 is provided for preventing the generation of aliasing distortion during the A/D conversion. The digitized FM video signal outputted from the A/D converter 2 is supplied to an RF processing circuit 7. This RF processing circuit 7 is comprised of a digital BPF (band pass filter) 3 for extracting only a component required for the detection of the video signal from the output signal of the A/D converter including the FM audio signal, a digital FM detector circuit 4 for FM detection of the extracted component, a video LPF 5 for extracting a base band component of the video signal from the detected output signal of the FM detector circuit 4, and a drop-out detection circuit 6 for detecting the drop-out of the video signal. The digitized video signal passed through the video LPF 5 is supplied to the drop-out correction circuit 8 and a PLL (phase locked loop) circuit 9.

The drop-out correction circuit 8 performs the correction of drop-outs in response to the drop-out detection signal supplied from the drop-out detection circuit 6. On the other hand, the PLL circuit 9 generates a master clock signal fM having a frequency of $4N_1 fsc$ ($N_1$ is an integer equal to or larger than 2, 4 for example, and fsc is the frequency of a color subcarrier signal) and synchronized with the digitized video signal supplied from the video LPF 5. The master clock fM is used as a sampling clock for the A/D converter 2, and as the clock signal for digital signal processing up to the video LPF 5. A divide by $N_1$ circuit 10 is provided for dividing the master clock by $N_1$, generating a clock signal WCK having a frequency of 4 fsc, and the clock WCK is used as the clock signal for the down sampling in the video LPF 5, and used as the sampling clock signal for the drop-out correction circuit 8.

The digitized video signal outputted from the drop-out correction circuit 8 is written into a buffer memory 12 by using the clock WCK. The read-out of data from the buffer memory 12 is performed by using a reference clock RCK having a frequency of 4 fsc generated by a reference clock signal generating circuit 11. The digitized video signal read out from the buffer memory 12 is converted to an analog form a by D/A converter 13, and outputted as a reproduced video signal.

FIG. 2 specifically shows an example of the PLL circuit 9. As shown, the playback horizontal sync signal (PBH) and the color burst signal (CB) are separated from the reproduced video signal by a signal separation circuit 21. As shown, the playback horizontal sync signal is supplied to a phase comparator 22 and the color burst signal is supplied to a phase comparator 24. A comparison output of the phase comparator 22 is supplied to a PLL control circuit 20 and also to a selector 23 as one of its two input signals. On the other hand, a comparison output of the phase comparator 24 is supplied to the PLL controller 20 and also to the selector 23 as the other one of the input signals thereof. The switching operation of the selector 23 is controlled by the PLL control circuit 20. The selection output signal of the selector 23 is supplied to a loop filter 25 for determining the loop characteristic of the PLL circuit. The loop filter 25 is a digital filter constructed to realize a desired characteristic, and its output is converted to an analog signal by a D/A converter 26, and in turn used as a control voltage for a VCO (voltage controlled oscillator) 27.

The oscillation frequency of the VCO 27 is controlled by the output voltage of the D/A converter 26, and its output signal becomes the master clock fM described before, and supplied to a divide by $N_2$ circuit 28, and a divide by $N_3$ circuit 29. The output signal of the divide by $N_2$ circuit 28 is supplied to the phase comparator 22 as the other one of its input signals, and the output signal of the divide by $N_3$ circuit 29 is supplied to the phase comparator 24 as the other one of its input signals. The PLL circuit is constructed by the circuit elements described above.

The divide by $N_2$ circuit 28 is provided for dividing the output signal $f_M$ of the VCO 27 to produce the horizontal scanning frequency $f_H$. Since $f_M = 4N_1 fsc$, then $N_2 = 910 N_1$ in the NTSC system. On the other hand, the divide by $N_3$ circuit is provided for dividing the output signal $f_M$ of the VCO 27 to produce the color subcarrier frequency fsc, hence $N_3 = 4N_1$. The PLL control circuit 20 is constituted by a combination of flip-flop circuits and PLAs (programmable logic arrays), or by a microcomputer, and performs operations, such as switching the selector 23, resetting the loop filter 25 in the initial state, or resetting the dividing circuits 28 and 29.

In the PLL circuit 9 constructed as described above, the selector 23 is controlled to select the output signal (a) of the phase comparator 22 in the initial state or a non-steady state where the video signal is not reproduced in a stable manner, thereby the PLL circuit performs synchronization locking to the horizontal sync signal. When the PLL circuit is synchronized with the playback horizontal sync signal and it is in the steady state, the selector 23 is operated to select the output signal (b) of the phase comparator 24, thereby the PLL circuit performs the pull-in of synchronism to the color burst signal.

When the video signal is stably reproduced in the steady state, the PLL circuit is synchronized with the color burst signal with the selector 23 operated to select the output signal (b) of the phase comparator 24. However, if the synchronization of the PLL circuit is lost or placed in the non-steady state, the selector 23 is switched to select the output signal (a), so that the operation of the PLL circuit is returned to the state of the pull-in of synchronism to the playback horizontal sync signal. Subsequently, the PLL circuit returns to the operations described above. The PLL control circuit 20 is operative to switch the position of the selector by judging the state of synchronization or the loss of synchronization, and reset the divide by $N_2$ circuit 28 when the selector 23 is switched to the position of selecting the output signal (a), and reset the divide by $N_3$ circuit 29 when the selector 23 is switched to the position of selecting the output signal (b) so that the initial phase error is maintained as the smallest possible.

The phase comparators 22 and 24 operate as the time base error detection means, and the phase error signals outputted from these phase comparators are the time base error signals. Thus the PLL circuit is synchronized so that the phase error becomes equal to 0.

FIG. 3 is a block diagram showing an example of the construction of the phase comparator circuit 24 in FIG. 2 though it is different from the circuit described in Japanese Patent Application Laid Open No. 62-140587. In this figure, an adding and subtracting circuit 30 which receives the color burst signal (CB) as one of its input signals performs addition or subtraction in accordance with the signal logic ("H" or "L") of the color subcarrier frequency fsc. An addition or subtraction output signal of this adding and subtracting circuit 30 is fed into the first register 31 consisting of a D-flipflop during the color burst period in accordance with a clock signal having a frequency of 4 fsc outputted from the PLL control circuit 20. The output signal of the first register 31 is fed into a second register 32 consisting of a D-flipflop every time of reception of a clock which is the same as the clock of the first register 31 itself. The first and second registers 31 and 32 constitute a shift register, and the content of each register is reset to "0", before the clock is inputted, by a reset signal outputted from the PLL controller 20. The output signal of the first register 31 is outputted as the $\Sigma A \cos \theta$ signal, and supplied as, one of the input signals, to a divider 33. On the other hand, the output signal of the second register 32 is outputted as the $\Sigma A \sin \theta$ signal and is inputted to the adding and subtracting circuit 30 and the divider 33 as the other one of the input signals respectively. The output signal of the divider 33 represents the phase error $\theta$, after passing through a $\tan^{-1}$ converter 34 which is constituted by a ROM.

The color burst signal constituting one of the input signals of the adding and subtracting circuit 30 is illustrated in FIG. 4. Since the sampling frequency is 4 fsc, there are four sampling points in one cycle of the color burst signal. For explanatory purposes, these four sampling points are designated as $S_1$, $S_2$, $S_3$, and $S_4$ in order from the leading edge of the signal of color subcarrier frequency fsc.

With this configuration, the contents of the first and second registers 31 and 32 are reset to "0" by the reset signal from the PLL control circuit 20, before the calculation of the phase error. When the first sampled value $S_1$ is inputted after the reset signal is removed, the output signal of the adding and subtracting circuit 30 becomes equal to $S_1$ since the signal of color subcarrier frequency fsc is at the "H" level. This signal is fed into the register 31 at the first leading edge of the clock signal. Because the content of the register 31 is shifted to the register 32 at this time, the content of the register 32 remains as "0". When the sampled value $S_2$ is inputted, the output signal of the adding and subtracting circuit 30 become equal to $S_2$ since the signal of the color subcarrier frequency fsc has the "H" level. This signal is fed into the register 31 at the second leading edge of the clock signal, and the signal $S_1$ shifted from the register 31 is fed into the register 32 at the same time. When the sampled value $S_3$ is inputted, the output signal of the adding and subtracting circuit 30 becomes equal to $S_1 - S_3$ since the signal of color subcarrier frequency fsc has turned to the "L" level. This signal is fed into the register 31 at the third leading edge of the clock signal, and the signal $S_2$ is fed into the register 32. When the sampled value $S_4$ is inputted, the output signal of the adding and subtracting circuit becomes equal to $S_2 - S_4$ because the signal of color subcarrier frequency fsc has the "L" level. This signal is fed into the register 31 at the fourth leading edge of the clock signal and the signal of $S_1 - S_3$ is fed into the register 32.

As described above, the output signal of the adding and subtracting circuit 30 changes from $S_1$ to $S_2$, $S_1 - S_3$, $S_2 - S_4$, $S_1 + S_1 - S_3$ in order, as the sampled value of the color burst signal is inputted in the order of $S_1$, $S_2$, $S_3$, $S_4$, $S_1$, .... In this way, the first and second registers 31 and 32 the values of $\Sigma(S_2 - S_4)$ and $\Sigma(S_1 - S_3)$ while shifting the contents cyclically. If the phase difference between the color burst signal and the signal of color subcarrier frequency and the amplitude of the color burst signal are respectively represented by $\theta$ and A, the sampled values $S_1$, $S_2$, $S_3$, and $S_4$ respectively become $A \sin \theta$, $A \cos \theta$, $-A \sin \theta$, $-A \cos \theta$ when the color burst period has ended and the clock signal is stopped. Therefore, at that time the output signal of the first register becomes $\Sigma(S_2 - S_4) + \Sigma A \cos \theta$, and the output of the second register 32 becomes $\Sigma(S_1 - S_3) = \Sigma A \sin \theta$. Thus, the output signal of the divider 33 becomes equal to $\tan \theta$, and the phase error $\theta$ is obtained as the output signal of the $\tan^{-1}$ converter 34.

As explained with reference to FIG. 1, the reproduced video signal is written into the buffer memory by using a clock signal which follows the jitter of the reproduced video signal, and the read-out of data from the buffer memory 12 is performed by using the stable reference clock which does not follow the jitter of the reproduced video signal. The jitter component of the reproduced video signal is absorbed in this way. The phase error of the PLL circuit through the above operation is a residual time base error. Specifically, if the open loop gain of the PLL circuit is expressed by G, the reduction of the time base error is expressed by $1/(1+G)$.

However, with the feedback loop using the PLL circuit as explained above, the frequency bandwidth of the loop is limited by a period of phase comparison $T = 1/fH$ (fH is a horizontal scanning frequency, equal to 15.734 KHz), so that the open loop gain decreases as the signal frequency goes up. This means that the performance of elimination becomes lower for high frequency components (higher than 1 KHz) of the time base error. If it is attempted to increase the open loop gain at around the frequency of 1 KHz, then the phase margin decreases, and, in the closed loop gain characteristic, a peak will be generated in a frequency range higher than 2 or 3 KHz. In the frequency range higher than 2 or 3 KHz, the real time base error component is rather small and, instead, noises contained in the video signal and the error component of the phase comparator are relatively large.

Therefore, the peak in the closed loop characteristic causes increase in these noises and errors, and it causes an increase in the time base error as a result.

On the other hand, it is possible to improve the overall correction characteristic by using a time base error correction by the feedforward operation at the same time. However, the improvement of the elimination of time base error in high frequencies can not be expected unless the control signal for the feedforward correction and the video signal are synchronized in phase with each other.

On the other hand, in the case of digital time base correctors of conventional VTRs using magnetic tape of 1 inch wide, a clock following the time base error is generated by using the PLL circuit, and a clock dividing circuit is reset in phase by the feedforward control operation. Then the output of the clock dividing circuit is modulated in phase by an analog method so that the residual time base error is reduced, and the output is used as the clock signal for the A/D conversion and as the writing clock signal. However, since phase resetting and phase modulation in the generation of the writing clock signal are performed before the A/D conversion, the PLL circuit including the signal separating circuit and the time base error detection circuit is constituted by analog circuits. Furthermore, the signal whose time base error is removed and written into the memory is only the picture signal portion after the color burst signal. Therefore, this kind of method can not be used in the case of totally digital processes applied from processing the RF signal. This means that separately generated sync signals and color burst signal must be added to the signal read out from the memory. Furthermore, a time base correction method in which the memory read-out clock is controlled in phase by using the time base error is sometimes used in combination. However, this type of correction is only effective after D/A conversion of the video signal, and is not suited for the case where signal processing is performed in the form of the digital video signal in a later stage.

OBJECT AND SUMMARY OF THE INVENTION

The present invention is based of the recognition of the above described problem, and an object of the present invention is therefore to provide a time base correction apparatus having an effective correction characteristic for high frequency components of the time base error.

Another object of the present invention is to provide a time base correction apparatus which performs the whole process in digital form, and has a high correction performance of time base correction operation.

According to a first aspect of the invention, a time base correction apparatus is configured such that a time base error component, which has not been removed by a feedback loop for performing time base correction of an input signal, is inputted to a filter having an amplitude characteristic approximating an open loop characteristic of the feedback loop in a high frequency range of that component of the time base error signal, and an input signal, which has been treated by time base correction through the feedback loop, is further treated by time base correction of a feedforward operation using an output signal of the filter circuit.

According to another aspect of the present invention, a time base correction apparatus is configured, in effecting a time base correction using a feedforward operation, so that a time base error component detected from an input signal is supplied to a filter having a predetermined amplitude characteristic, the input signal is delayed by a time period corresponding to the delay time of the filter so that the input signal and the output signal of the filter have the same phase, and subsequently time base correction of the delayed input signal is performed using the output signal of the filter.

According to a further aspect of the invention, a time base error correction apparatus is configured so that the time base error contained in the video signal is detected, a writing clock signal following the time base error is generated in accordance with the detection output, a stable read out clock signal which does not follow the time base error is generated, the video signal is delayed by a delay time which is determined by the time base error detection output, and the delayed video signal is written into the memory in accordance with the writing clock signal and in turn read out from the memory in accordance with the read out clock signal.

According to a still further aspect of the invention, a time base correction apparatus comprises a variable delay device for delaying a video signal sampled by a clock having a frequency of a multiple of a color subcarrier frequency by a factor of an integral number, and the delay time of the variable delay device is controlled within a positive and negative shift of less than one sampling period about a delay time corresponding to an integral number of samples as a central value, at least at the color subcarrier frequency.

DETAILED DESCRIPTION OF PREFERRED EMBODIMENTS

Embodiments of the present invention will be described with reference to the accompanying drawings.

Figure 1:
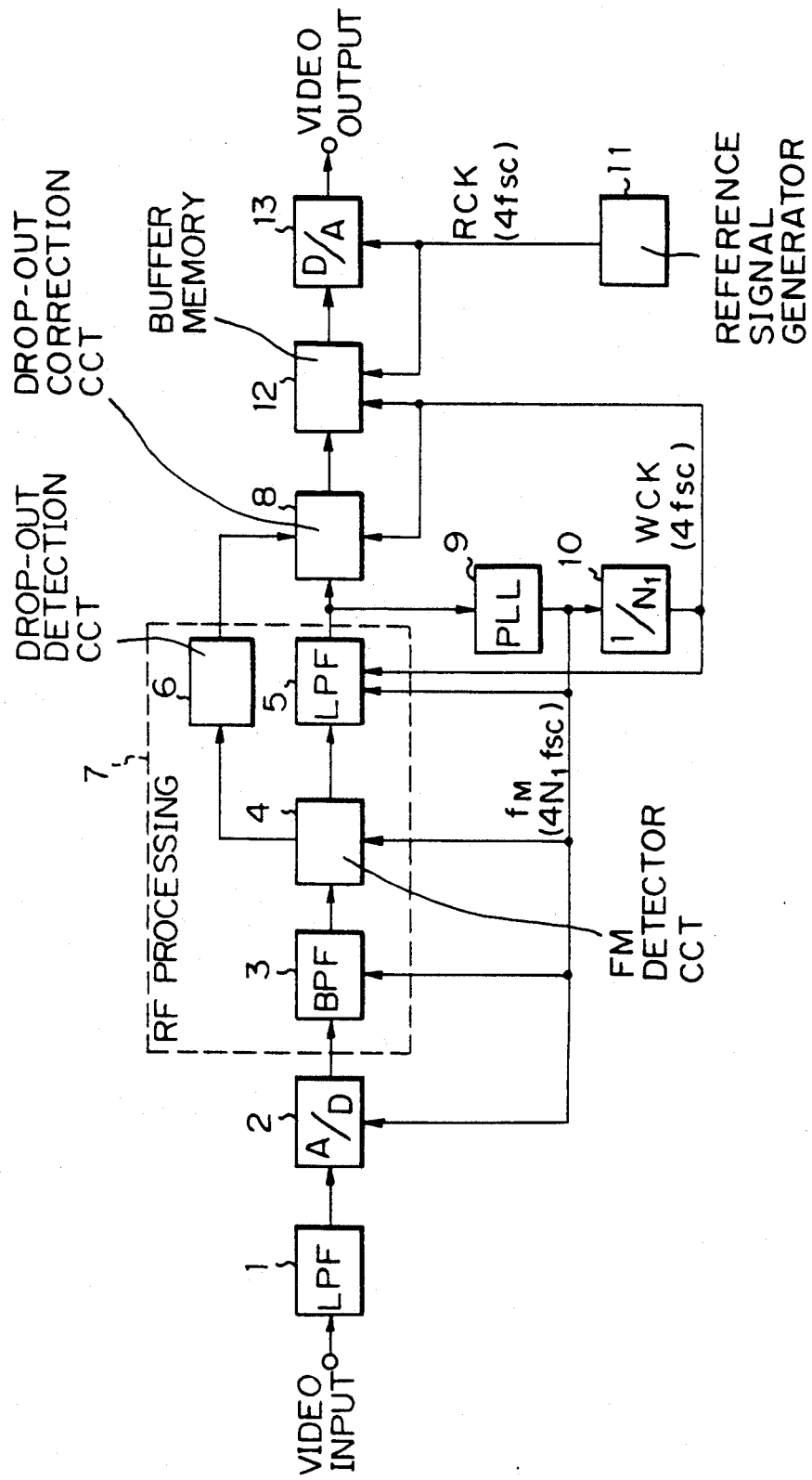
FIG. 1 is a block diagram showing a video signal reproducing system having a conventional time base correction apparatus.
Figure 2:
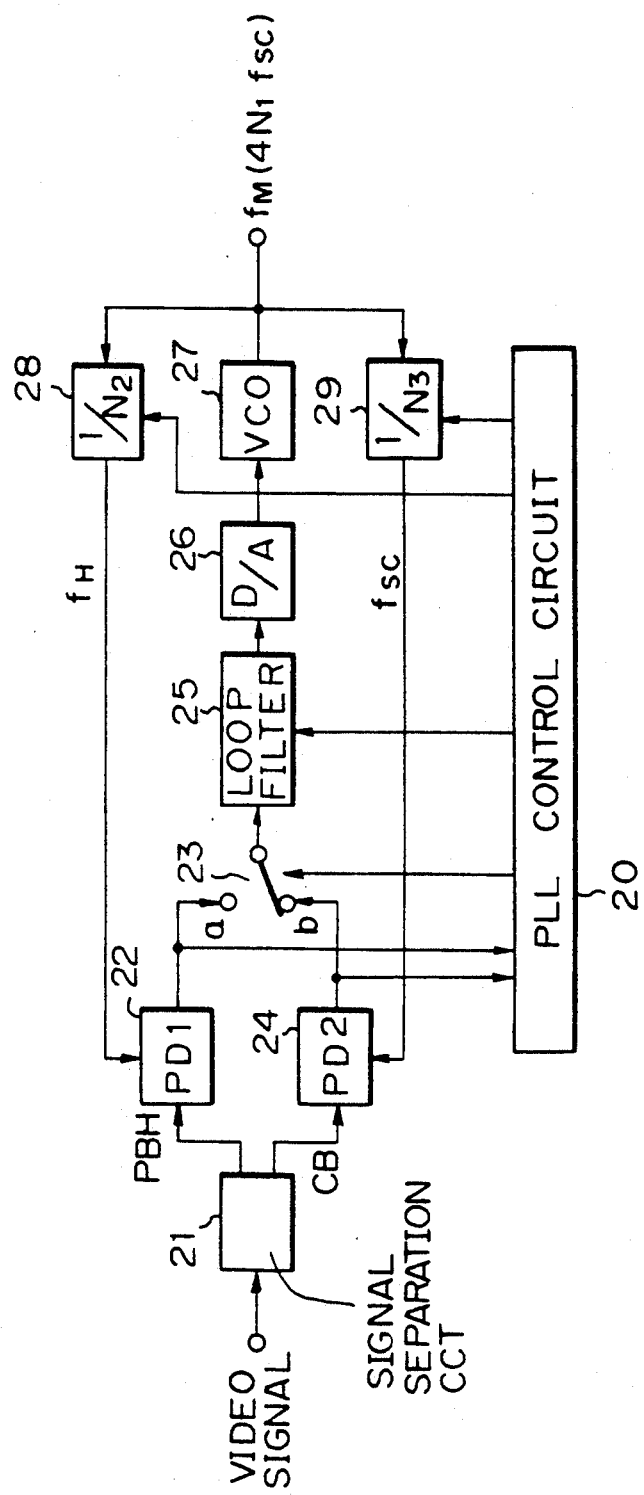
FIG. 2 is a block diagram showing an example of the conventional PLL circuit in FIG. 1 and FIG. 5.
Figure 3:
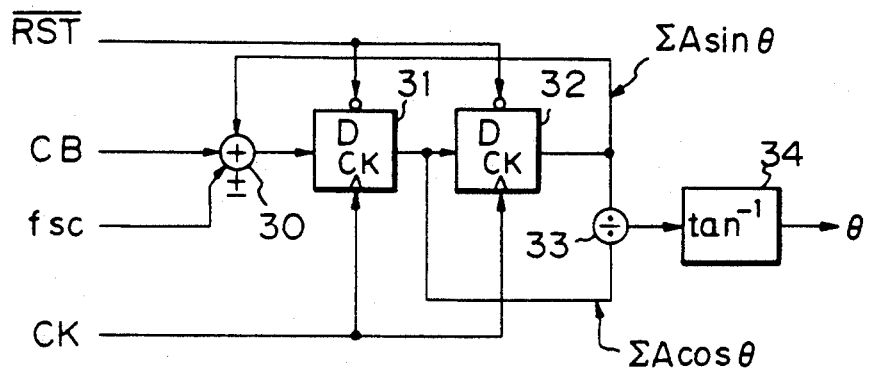
FIG. 3 is a block diagram showing an example of the configuration of the conventional phase comparator in FIG. 2.
Figure 5:
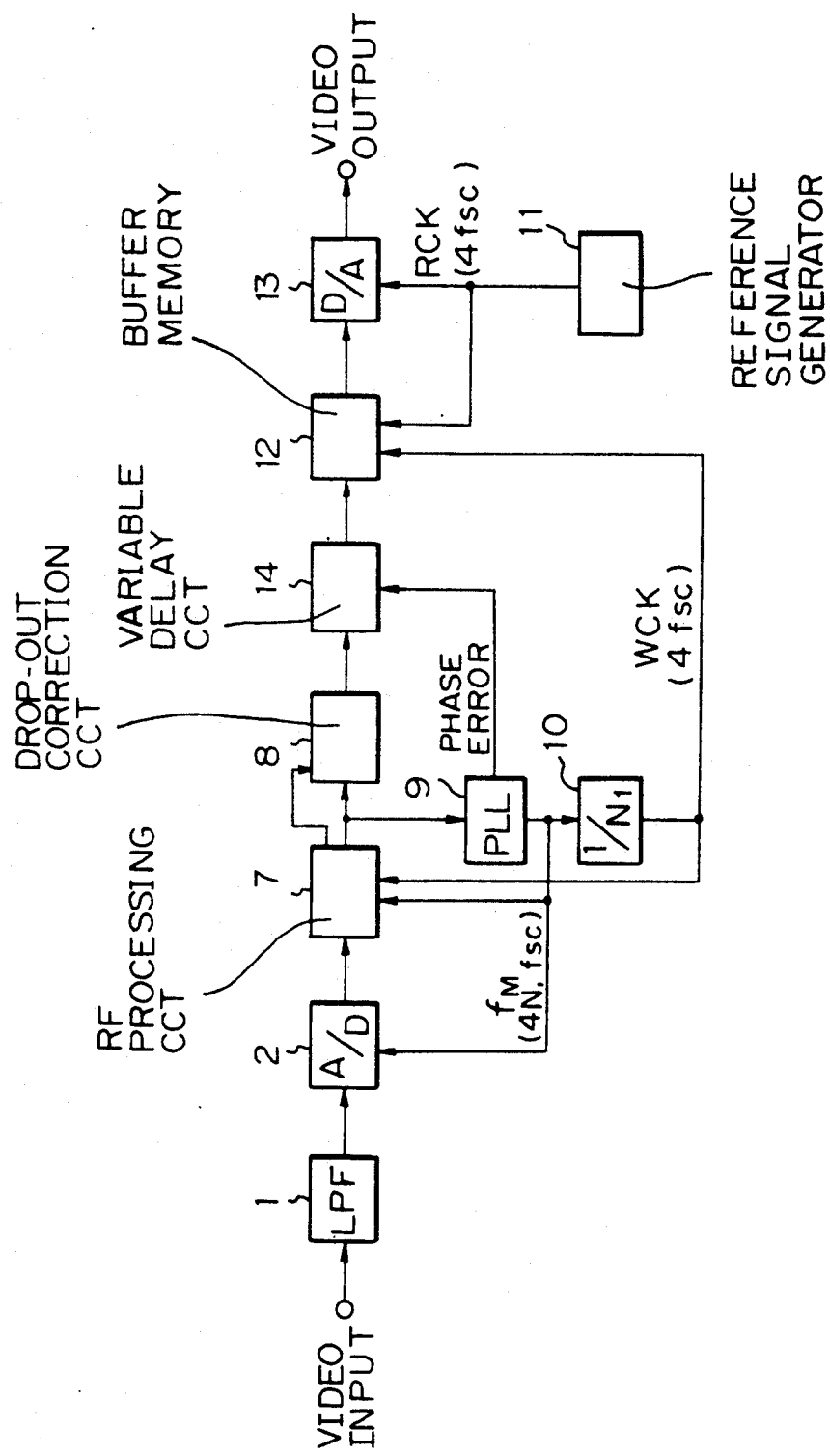
FIG. 5 is a block diagram showing the configuration of a video signal reproducing system having a time base correction apparatus according to the present invention.

FIG. 5 is a block diagram of a video signal reproducing system including a time base correction apparatus according to the present invention, for example, configured to perform processing operations in digital form. The system illustrated in this figure features a variable delay device 14 which is inserted in the system shown in FIG. 1. In these figures like reference numerals are used to denote corresponding or like blocks. In the variable delay device 14, a time base correction operation is performed for the digital video signal supplied from the drop-out correction circuit 8 by using the phase error signal from the PLL circuit 9. In the steady state, the phase error signal of the PLL is detected by means of the color burst signal.

In the time base correction operation using the PLL circuit, a residual time base error is derived as a component generated when the sampling clock signals (fM, WCK) were unable to follow the jitter of the video signal. On the other hand, the variable delay device 14 is configured to cancel the residual time base error by a feedforward operation by varying the amount of delay of the video signal without changing the sampling clock signal. The video signal from which the residual time base error with respect to the sampling clock WCK is to be corrected by means of the variable delay device 14 is written into the buffer memory 12 by means of this sampling clock WCK. The correction of time base error is completed by reading out the stored signal by using the base clock signal RCK as in the case of the system shown in FIG. 1.

Figure 6:
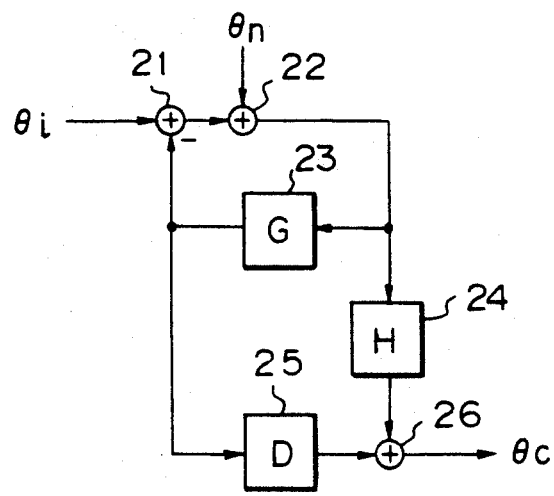
FIG. 6 is a diagram showing an equivalent circuit of the time base correction system in FIG. 5.

FIG. 6 shows an equivalent circuit of the time base correction system shown in FIG. 5. In this figure, the reference numeral 21 denotes a block representing the phase comparator of the PLL, 22 denotes a block representing the phase comparator of the PLL, 22 denotes a block representing a noise adder which equivalently indicates addition of noises, and 23 denotes a block showing the open loop characteristic of the PLL. With these functional elements, the correction of time base error by the feedback loop of the PLL is performed. Furthermore, the reference numeral 24 denotes a filter which receives the output signal of the noise adder 22, and outputs a feedforward correction signal, 25 denotes a delay circuit having a delay a mount, for example, equal to that of the filter 24 and whose transfer function is indicated by D, and 26 denotes a correction adder. These functional elements correspond to the variable delay device 14 shown in FIG. 5, and perform the time base correction by the feedforward operation. On the other hand, $\theta i$ represents the jitter in the reproduced video signal. However, with noise components contained in the reproduced video signal or error components of the phase comparator 21, a time noise component $\theta n$ is added to the phase error equivalently by the noise adder 22, and it is fed back to the loop of the PLL circuit. From this figure, the time base correction signal $\theta c$ is given by the following equation.

$$\theta_c = \frac{(H - DG)(\theta_i - \theta_n)}{1 - G} \quad (1)$$

Since $\theta c$ is delayed with respect to $\theta i$ by an amount determined by the transfer function D, the residual time base error after the time base correction using the feedback and the feedforward is expressed by $D\theta i - \theta c$. By inserting the above equation (1), the following equation is obtained.

$$\theta_{ce} = D\theta_i - \theta_c \quad (2)$$
$$= \frac{(D - H)\theta_i - (H - DG)\theta_n}{1 - G}$$

Since there is less correlation between $\theta i$ and $\theta a$, it is necessary to reduce both of $(D-H)\theta i$ and $(H+DG)\theta n$ near 0 in order that $\theta ce$ approaches to 0. If we consider the frequency characteristic, the value of $\theta i$ is larger than $\theta n$, and $\theta i$ dominates for the low frequency range. On the other hand, the value of $\theta i$ is small and $\theta n$ dominates for the high frequency range.

If the open loop gain of the PLL circuit is determined to be large for frequencies up to 1 KHz, a peak is generated in the error response $1/(1+G)$ of the closed loop because of the insufficiency of the phase margin in a frequency range higher than 2-3 KHz. As a result, $\theta n$ is amplified in the high frequency range. Therefore, in the above equation (2), $\theta ce$ can be made near to 0 if the term $\theta i$ is made near to 0 in the low frequency range where $\theta i$ is sufficiently large, and if the term $\theta n$ is made near to 0 in the high frequency range where $\theta i$ is sufficiently small. In other words, it is sufficient that $H \approx D$ in the low frequency range, and $H \approx -DG$ in the high frequency range. Moreover, $|D| = 1$ and its delay characteristic is the same as that of H, and $G \approx -|G|$. Hence, in order to satisfy the above condition, it is sufficient that the function has such a characteristic that $|H| \approx 1$ in the low frequency range, and $|H| \approx |G|$ in the high frequency range.

Figure 7:
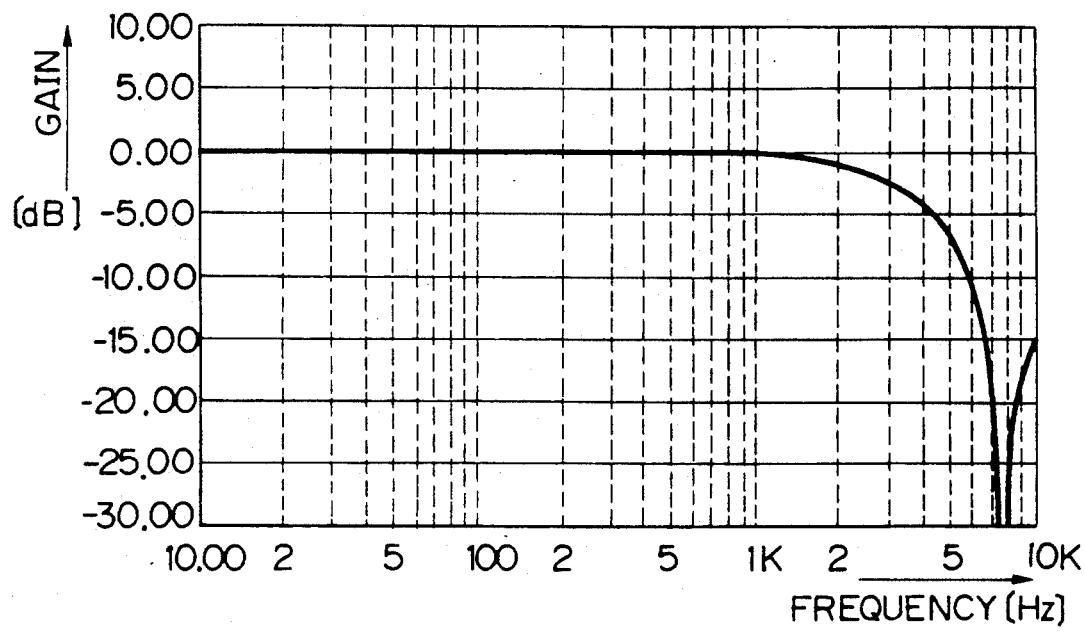
FIG. 7 is a diagram showing an example of amplitude characteristic of the filter shown in FIG. 5.

As such a function mentioned above, the following function can be selected:

$$H = \frac{1 - Z^{-1}}{2} \cdot \frac{1 - e^{-sT}}{sT} \quad (3)$$

where $T = 1/fH$, and $Z^{-1}$ represents the delay of one sampling with the clock of fH. The second multiplying term is a hold function. H expressed by the above equation has a linear phase, and a constant delay amount $z^{-1}$. Therefore, $D = Z^{-1}$. In addition, the amplitude characteristic thereof satisfies the above condition, as illustrated in FIG. 7.

Figure 8:
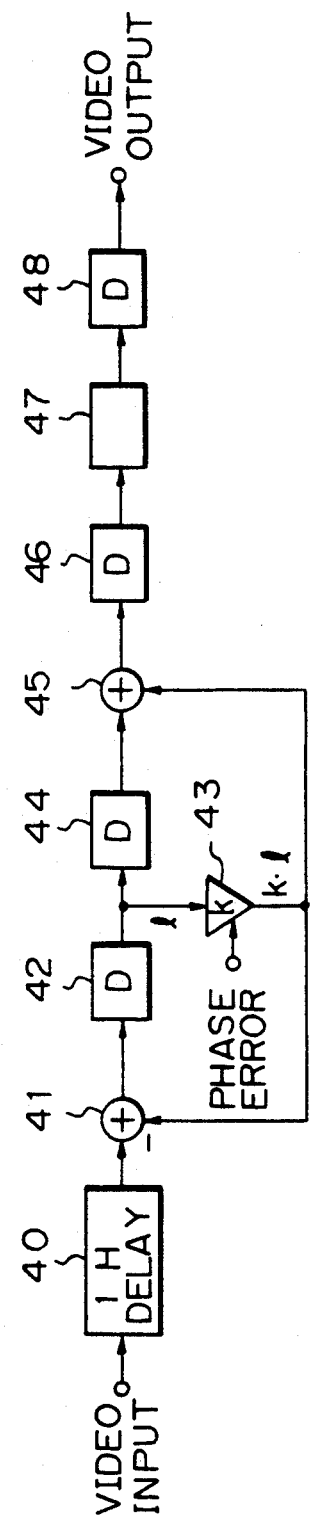
FIG. 8 is a block diagram showing a specific circuit configuration of the variable delay circuit in FIG. 5.

FIG. 8 shows specific circuit construction of the variable delay device 14 shown in FIG. 5, that is, the filter 24, the delay circuit 25, and the correction adder 26 shown in FIG. 6. The filter 24 has the above transfer function. In the figure, a 1 H delay circuit 40 delays the inputted video signal for one horizontal scanning period, and the delayed video signal is inputted to a subtractor 41 as one of its input signals. The subtraction output signal of the subtractor is supplied to a first register 42. The output signal of the first register 42 is in turn supplied to a second register 44 as its input signal, and also to a multiplying circuit 43 having a multiplication coefficient k. The output signal of the multiplying circuit 43 is in turn supplied to the subtractor 41 as the other input signal thereof, and also is supplied to an adder 45 as an input signal thereof. On the other hand, the output signal of the second register 44 is supplied to the adder 45, and added to the output signal of the multiplying circuit 43. The addition signal is supplied to an overflow circuit 47 through a third register 46, wherein the dynamic range thereof is limited. Subsequently, the addition signal is latched by a fourth register 48, thereby a video signal is outputted.

Figure 9:
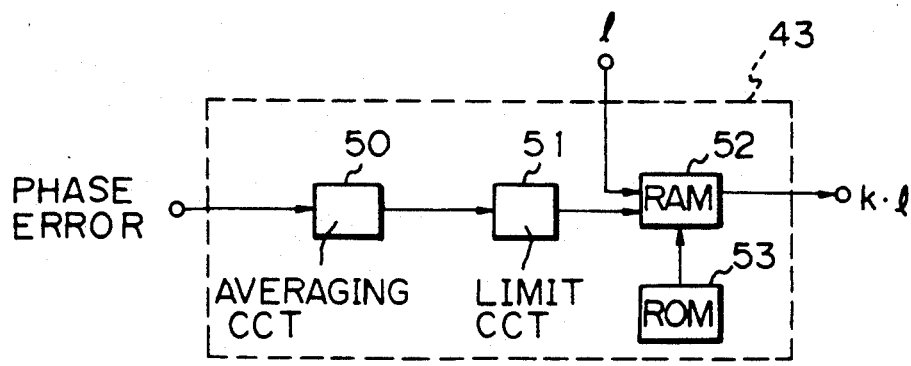
FIG. 9 is a block diagram showing a specific circuit configuration of the multiplexing circuit in FIG. 8.

The multiplying circuit 43 is constructed as illustrated in FIG. 9, in which the phase difference signal in the PLL circuit shown in FIG. 5 is averaged in an averaging circuit 50, and limited in amplitude in a limit circuit 51, and provided as the address of a RAM 52. Also, output 1 of the register 42 shown in FIG. 8 is provided as the address of the RAM 52. The RAM 52 is operative to output a result of multiplication between a coefficient k determined by the output of the limit circuit 51 and the output 1 of the first register 42. Multiplication data is previously stored in a ROM 53, and loaded into the RAM 52 when the power current is thrown-in. The output of the RAM 52 forms the other input of the subtractor 41 and adder 45.

Now, the operation of the variable delay circuit 14 constructed as explained above will be explained.

The 1 H delay circuit 40 corresponds to the delay circuit 25 of FIG. 6. The averaging circuit 50 averages the phase error of the PLL circuit which is inputted every one horizontal line, between two horizontal lines, and holds it for one horizontal line period. That is, the averaging circuit 50 has the transfer function of the above described equation (3), and operates as the filter circuit 24 shown in FIG. 6 which receives the phase error component of the PLL circuit. The limit circuit 51 is provided for determining the range of variation of a value k which will be described later, and limits the amplitude of the output signal of the averaging circuit 50. Thus, the output of the limit circuit 51 corresponds to the feedforward correction signal which was described before.

The subtractor 41, the first register 42, the multiplying circuit 43, the second register 44, and the adder 45 together constitute a first order all pass filter (referred to as APF hereinafter) having the following transfer function $H_A(z)$.

$$H_A(z) = \frac{Z^{-1} - k}{1 - k \cdot Z^{-1}} \quad (4)$$

where k is a multiplication coefficient, and $Z^{-1}$ represents the delay of one sampling with the sampling clock WCK.

Figure 10:
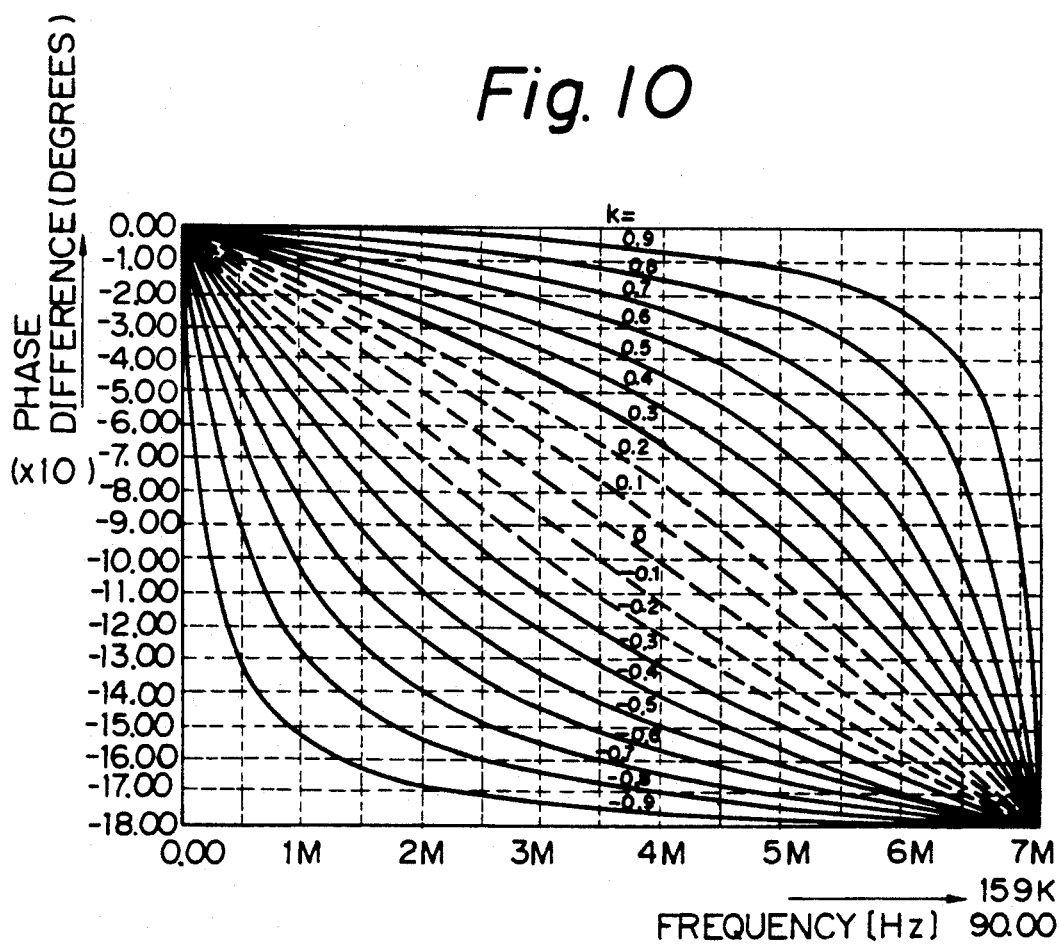
FIG. 10 is a diagram showing a phase characteristic of the circuit shown in FIG. 8.

The APF of this circuit has a variable multiplication coefficient k, and FIG. 10 shows the phase characteristic of the APF when the multiplication coefficient k is varied. Assume that the phase delay and the angular frequency are expressed by $\theta$ and $\omega$ respectively, then the delay time at each frequency is $\theta/\omega$, and it is proportional to the inclination of the line connecting each point and the origin of the picture. It is thus recognized that the phase characteristic, i.e., the delay characteristic is varied by the multiplication coefficient. On the other hand, the amplitude characteristic becomes equal to 1 irrespective of the value of the multiplication coefficient. The APF operates as the correction adder 26 of FIG. 6 performing the time base correction by the feedforward operation, by varying the multiplication coefficient in accordance with the output signal of the limit circuit 51, and varying the delay time of the video signal outputted from the 1 H delay circuit 40.

A result of multiplication k·l between the output signal 1 of the first register and and the variable multiplication coefficient k in the multiplying circuit 43 is determined by the table look-up method. More specifically, values of the result of multiplication k·l between the multiplication coefficient k responsive to the output of the limit circuit 51 and the output 1 of the register, are previously loaded into the RAM 52 from the ROM 53. The output 1 of the register and the output of the limit circuit 51 are used as address inputs of the RAM 52, and a value of k·l is read-out from the RAM 52. On the other hand, the multiplication using the above described variable coefficient can be performed, especially in the case of a LSI, by using such an arrangement in which a plurality of shifters respectively performing a shift operation by a different bit number and a plurality of adders sufficient, in number, for adding all of outputs of the shifters are combined together, and the coefficient is varied by changing the ON/OFF state of the addition of the output of each shifter, in order to reduce the scale of the circuit. Moreover, it is also possible to use the multiplying circuit as it is after converting the output signal of the limit circuit 51 to a corresponding value of the multiplying coefficient k, if the restriction of the circuit scale is relatively moderate and the speed of operation is sufficiently high.

The output signal of the adder 45 which constitutes the output signal of the APF is latched by a third register 46, and the dynamic range of n-bit is limited by the overflow circuit 47 for portions whose dynamic range exceeds a range of n (for example, n=8) bit in accordance with operations in the APF circuit. Then the signal is latched by the fourth register 48, and outputted. In addition, all of the registers in FIG. 5 operate in accordance with the sampling clock signal WCK.

In the above embodiment, the first order APF is used for effecting the time base correction by means of the feedforward operation. However, it is of course possible to use circuit such as an APF of n-th (n is an integer greater than 2) order.

Further more, in the case of the above embodiment, the invention has been described by way of an example in which the time base correction apparatus is used in a video signal reproducing apparatus using totally digital processing. However, it is possible to apply the circuit according to the present invention in a video signal reproducing system using analog processing.

Furthermore, the form of the input signal is not limited to the video signal, and the apparatus according to the present invention is applicable to treat any signal having a time base error mainly consisting of low frequency components.

As specifically explained above, in the first embodiment of the time base correction apparatus according to the present invention, the time base error component, which was not removed by the time base correction operation using the feedback loop, is inputted into 1 a filter having a high frequency amplitude characteristic approximate to the open-loop characteristic of the feedback loop, and the time base error is further corrected by the feedforward operation using the output signal of the filter. Therefore, the noise components can be suppressed even if the bandwidth of the feedback loop is widened, and an efficient time error correction operation can be performed up to a high frequency range.

Moreover, by setting the amplitude characteristic in the low frequency range of the filter in the feedforward correction system to be generally equal to 1, the time base correction can be effectively performed in the low frequency range.

Furthermore, with the filter which has been described in connection with the preferred embodiment, the switching of the multiplying coefficient takes place during the horizontal blanking period. Therefore, it is advantageous that the switching point of the coefficient is not shown in the picture.

Again, it is to be noted that the present invention is applicable to a system in which all of the signal processing is performed in digital form, and for example the phase comparator proposed by the applicant of the present application, described in Japanese Patent application No. 62-121843 can be used for the detection of the time base error. In the case of using that phase comparator, the detection and correction of the time base error are performed very accurately, and also there is an advantage that the above-mentioned phase comparator can be easily formed in an LSI circuit.

The second feature of the present invention will be explained hereinafter.

In the equation (2), as mentioned before it is necessary to reduce both $(D-H) \theta_i$ and $(H+DG) \theta_n$ near to 0 in order that $\theta_{ce}$ approaches to 0 because there is less correlation between $\theta_i$ and $\theta_a$.

Specifically, in equation (2), if $\theta_n$ can not be disregarded, $\theta_i$ dominates in the low frequency range, and $\theta_n$ dominates in the high frequency range. Since $H \approx D$ in the low frequency range, and $G \approx -|G|$ in the high frequency range, it is only necessary to satisfy the condition of $H \approx -DG \approx -D|G|$. On the other hand, if $\theta_n$ is small and it can be disregarded, it is only necessary to satisfy the condition of $H \approx D$ in the whole frequency range. Hence, in both cases, the optimum selection is to equalize the delay characteristics of D and H, with respect to the delay characteristic. Instead, if the delay characteristics of D and H are not equal, the phase difference becomes large especially in the high frequency range, then each integral term of the equation (2) does not approach 0, and the residual time base error in the high frequency range becomes large, as a result. In addition, with respect to the amplitude characteristic, it is only necessary to satisfy the condition of $|H| \approx |D|$ in the low frequency range, and the condition of $|H| \approx |D|$ or $|H| \approx |D| \cdot |G|$ depending on the magnitude of $\theta_n$, in the high frequency range. Furthermore, in the case of the video signal, the input signal of the filter 24 is renewed in each horizontal blanking period. Hence the renewal of the feedforward correction signal will be performed in the horizontal blanking period if the delay times of D and H are equal to each other and also equal to a multiple of the horizontal scanning period by the factor of an integer. Thus, it is possible to make the switching point of the correction signal unobtrusive on the screen of the monitor TV. For example, the delay time becomes equal to one horizontal scanning period if the transfer function of the filter 24 is determined as given by the following equation (3). In that case, it is only necessary that the delay circuit 25 also has a delay time of one horizontal scanning period.

In addition, the amplitude characteristic of the equation (3) is near 1 in the low frequency range, and approaches $|G|$ in the high frequency range. Therefore, it conforms to the aforementioned case where $\theta_n$ can not be disregarded, if the condition of $|D|=1$ is satisfied.

Figure 11:
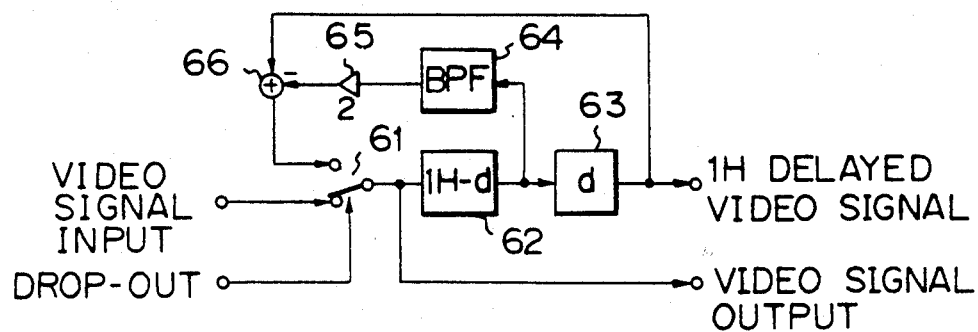
FIG. 11 is a block diagram showing a specific circuit configuration of the drop-out correction circuit in FIG. 5.

The 1 H delay circuit shown in FIG. 8 can be used also as the delay circuit in the drop-out correction circuit 8 shown in FIG. 5. A specific circuit construction of the drop-out correction circuit 8 is shown in FIG. 11. In this figure, the reference numeral 61 denotes a selector operated by the drop-out detection signal. The numeral 62 denotes a first delay circuit for delaying the output signal of the selector 61 by a time period 1 H−d (H is the horizontal scanning period, and d is a delay amount of the band-pass filter 64). The numeral 63 denotes a second delay circuit for delaying the output signal of the first delay circuit 62 by a time period of d. The numeral 64 denotes a band-pass filter, having a delay time d, for extracting the color signal from the delayed output signal of the first delay circuit 62. The numeral 65 denotes a multiplier for doubling the color signal component extracted by the band-pass filter 64, and the numeral 66 denotes a subtractor for subtracting the output signal of the multiplying circuit 65 from the delayed output signal of the second delay circuit 63.

In the drop-out correction circuit constructed as mentioned above, the selector 61 selects the input video signal when the drop-out is not generated, in turn issues same as the output video signal, and supplies it to the first delay circuit 62. The output of the first delay circuit 62 is supplied to the band-pass filter 64 and the second delay circuit 63, so that the output signal of the band-pass filter 64 and the output signal of the second delay circuit 63 respectively become a color signal and a video signal, both delayed with respect to the output signal of the selector 61 by 1 H. The output signal of the band-pass filter 65 is doubled by the multiplier 65, and in turn subtracted from the output signal of the second delay circuit 63 at the subtractor 66. Hence, the output signal of the subtractor 63 is a video signal whose color signal is inverted in phase, and is delayed by 1 H with respect to the output signal of the selector 61. If the dropout is generated, the selector 61 selects this subtraction signal and issues same as the video output signal. Drop-out correction is performed as a result. Since the output signal of the second delay circuit 63 is delayed with respect to the video output signal by 1 H, the 1 H delay circuit 40 can be omitted by supplying this signal to the subtracting circuit 41 in FIG. 8.

In the above-described embodiment, the first-order APF is used for the time-base correction of the feedforward operation. However, this is not limitative, and other circuit such as an n-th order APF can be used instead of the first-order APF.

Moreover, the input signal is not limited to the video signal, and the apparatus according to the present invention can be used for treating any signal having a time base error mainly consisting of low frequency component. In that case, the same effect as the above embodiment can be produced.

As explained so far, the time base correction apparatus according to the second aspect of the present invention is configured that, in the time base correction process using the feedforward operation, the a time base error component detected from the input signal is supplied to a filter having a predetermined amplitude characteristic, and the input signal is delayed by an amount corresponding to the delay time of the filter, and the time base correction of the delayed input signal is performed by an output of the filter. Therefore, effective time base correction operation is performed also for high frequency range.

Furthermore, when the input signal is a video signal and the time base error is detected every horizontal blanking period, the renewal point of the time base correction amount of the feedforward operation is put in the horizontal blanking period by making the delay times of the filter and the delay circuits in the feedforward correction system equal to each other, and also equal to a multiple of the horizontal scanning period by a factor of an integer. In this way, the renewal point can be made unobtrusive on the screen of the monitor TV.

Moreover, by using the filter shown in the embodiment, noise components in the high frequency range can be suppressed by its amplitude characteristic.

Furthermore, if the time base correction apparatus according to the present invention is used in a video signal reproducing system, the delay circuit in the dropout correction circuit can be used as the delay circuit in the feedforward correction system so that the scale of the circuit can be reduced.

In addition, although the present invention can be applied to analog processing, it can be used in apparatuses in which all of the signal processing operations are performed in digital form. Therefore, as mentioned before, the phase comparator proposed by the applicant of the present application, described in Japanese Patent Application No. 62-121843 can be used for the detection of the time base error. In that case, the detection and correction of the time base error are performed very accurately, and also there is an advantage that the above-mentioned phase comparator can be easily formed in an LSI circuit.

The third feature of the invention will be described hereinafter. The operation of the variable delay device 14 which is illustrated in FIG. 8 will be discussed first. This device is realized by using a first-order all pass filter (APF) whose multiplication coefficient is variable. The transfer function H(z) of the APF is given by the following equation.

$$H(z) = (Z^{-1} - k)/(1 - k \cdot Z^{-1})$$

Figure 4:
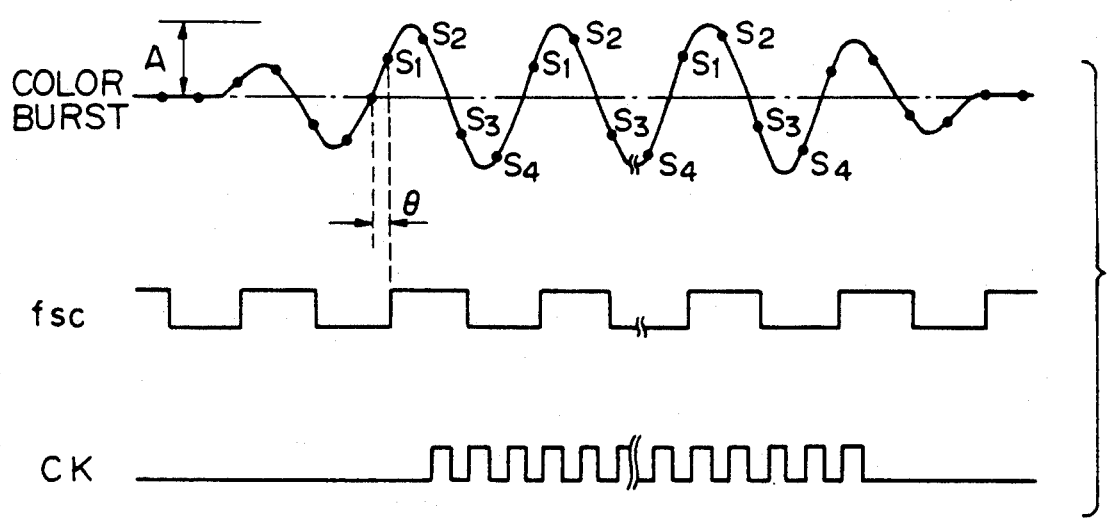
FIG. 4 is a timing chart for explaining the operation of the circuit shown in FIG. 3.

This apparatus is configured to vary the multiplication coefficient by the residual time base error detected from the phase error of the PLL circuit, and the delay time is varied to cancel the residual time base error. The phase characteristic of the APF when the multiplication coefficient is varied is illustrated in FIG. 4. If the phase delay is $\theta$ and the angular frequency is $\omega$, then the delay time at each frequency is given by $\theta/\omega$. Therefore, it is proportional to the inclination of a line connecting each point and the origin of the figure. Thus, it will be appreciated that the phase characteristic, i.e., the delay characteristic is determined by the multiplication coefficient. In addition, since this apparatus is an APF, the amplitude characteristic is always constant irrespective of the value of the multiplication coefficient. As shown in this figure, the phase characteristic becomes a straight line when $k=0$, and the delay time becomes a constant value of 69.84 nanoseconds corresponding to one sampling irrespective of the frequency. This is also apparent from the fact that the transfer function becomes equal to $Z^{-1}$.

Therefore, the residual time base error is canceled by setting k equal to 0 ($k=0$) when the phase error of the PLL circuit is 0, and varying the value of k in the inverse direction with respect to the direction of the change in the phase error of the PLL circuit for both the positive and negative directions, so that the amount of variation in the delay time corresponds to the phase error. By setting the value of k in this way, the phase of average sample points in the output signal of the APF becomes 0°, 90°, 180°, and 270° relative to the color burst signal, so that demodulation of the color signal by the digital process, for example, is facilitated. If the digital process is not used, it becomes unnecessary that the center value of the multiplication factor k is 0, and the range of variation of k is determined according to the following condition.

1. A good linearity of the change in the delay time against the change in the multiplication coefficient k is attained at around the color subcarrier frequency fsc.

2. The disposition of the sinuosity of group delay characteristic changes little when the multiplication coefficient k is changed.

3. A sufficient range of correction is assured.

If the linearity mentioned in the above item 1 is not good, the accuracy of the correction deteriorates. Especially, since the residual time base error at around fsc generates a color variation or color blur which is prominent on the screen, the linearity at this frequency is important. The second condition recited above means that the sinuosity of the group delay characteristic can be corrected by the circuits after the buffer memory 12 in the block diagram of FIG. 5, and it is only necessary that the disposition of the sinuosity of the group delay characteristic does not change with respect to the change in the multiplication coefficient k. Regarding the third condition, it is sufficient that the correction range of 16.37 nanoseconds is assured as described later. Although it is very difficult to satisfy all of the above three conditions, a satisfactory result can be obtained if the variation range of the multiplication coefficient is determined between 0.45 to 0.7. In addition, when the central value of the multiplication coefficient is 0, it is slightly disadvantageous with respect to the second condition. However, there will be no significant problem in practical use.

Figure 13A:
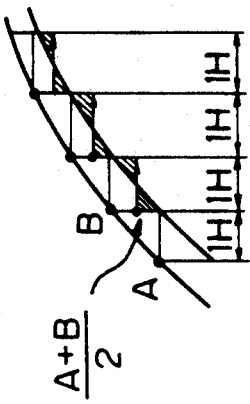
FIGS. 13A through 13C are waveform diagrams for explaining the operation of the circuit shown in FIG. 8.
Figure 13B:
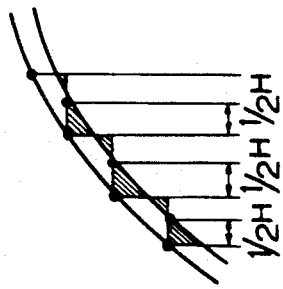
Figure 13C:
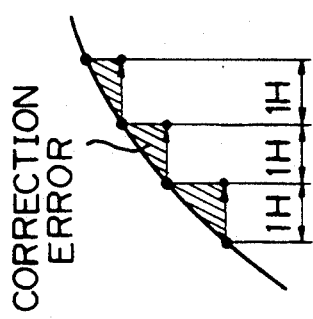

FIGS. 13A through 13C are waveform diagrams for explaining the correction operation for correcting the residual time base correction performed by the apparatus according to the present invention. As shown, the solid curve indicates the residual time base error, each rectangular portion indicates the correction amount of the residual time base error by the correction operation of the apparatus, and the area covered by oblique lines indicates the correction error. FIG. 13A indicates that the correction error is relatively large in the case where the correction operation is performed by the 0-order holding of the phase error signal of the PLL circuit. On other other hand, as shown in FIG. 13B, if the video signal is delayed by ½ H, the phase error becomes smaller as compared with the case shown in FIG. 13A. However, in this case, there is a possibility that the switching point of the phase error signal of the PLL circuit appears as a vertical line in the center of the screen. FIG. 13C shows the operation in the case where average values of the phase error signal of the PLL circuit obtained between adjacent two horizontal scanning lines are used as the coefficient control signal, and the video signal is delayed by 1 H. In this case, the correction error is the same as that in the case shown in FIG. 5b, but the switching point of the multiplication coefficient does not appear on the screen because it is located in the horizontal blanking period. Moreover, noise superimposed on the phase error signal of the PLL circuit is reduced by the averaging operation, so that the color variation or color blur is reduced. Hence the method shown in FIG. 13C is adopted in this apparatus.

Specifically, in the arrangement shown in FIG. 8, the input video signal is delayed by the 1 H delay circuit 40, and the correction of the residual time base error is performed by the APF circuit realizing the above-mentioned transfer function, which is constituted by the subtractor 41, the first register 42, the second register 44, the adder 45, and the multiplying circuit 43. In the multiplying circuit 43, the average value of the phase error signal of the PLL circuit is generated between two horizontal scanning periods at the averaging circuit 50, and the coefficient control signal which is limited in dynamic range within m (m=4, for example) bit is provided after passing through the limit circuit 51.

In the steady state, the phase error signal of the PLL circuit forms the phase error signal of the color burst signal, and the LSB of this signal corresponds to the time period of 1.09 nanosecond. With this resolution, a sufficiently accurate correction operation can be performed. In addition, with m=4, the correction range of 16.37 nanoseconds can be obtained. Since the amplitude of the residual time base error inputted into this apparatus is within this range in almost all cases, this value of correction range is sufficient.

As explained with reference to FIG. 8 before, the multiplication value k·l between the output signal l of the first register 42 and the multiplication coefficient k is determined by the table look-up method.

In the present apparatus, the correction operation is performed with the accuracy of 16 steps (from 0 to 15) by the coefficient control signal having 4 bits. Therefore, if the circuit performing this operation is constructed by shifter circuits and adder circuits, four adder circuits and eight adder circuits must be used respectively for the denominator and the numerator of the transfer function. If the scale of the circuit is to be reduced for producing an LSI performing the above operation, the number of the adders can be reduced to three respectively for the denominator and the numerator by using a three bit control signal with the accuracy or the dynamic range of the operation reduced by half. On the other hand, if the limitation on the scale of the circuit is relatively moderate and the speed of operation is sufficient, the adders may be used as they are.

In the embodiment described before, the APF circuit is constructed by using two adders and two delay elements. However, it is also possible to use 2 n (n is a natural number) adders and 2 n delay elements.

Figure 14:
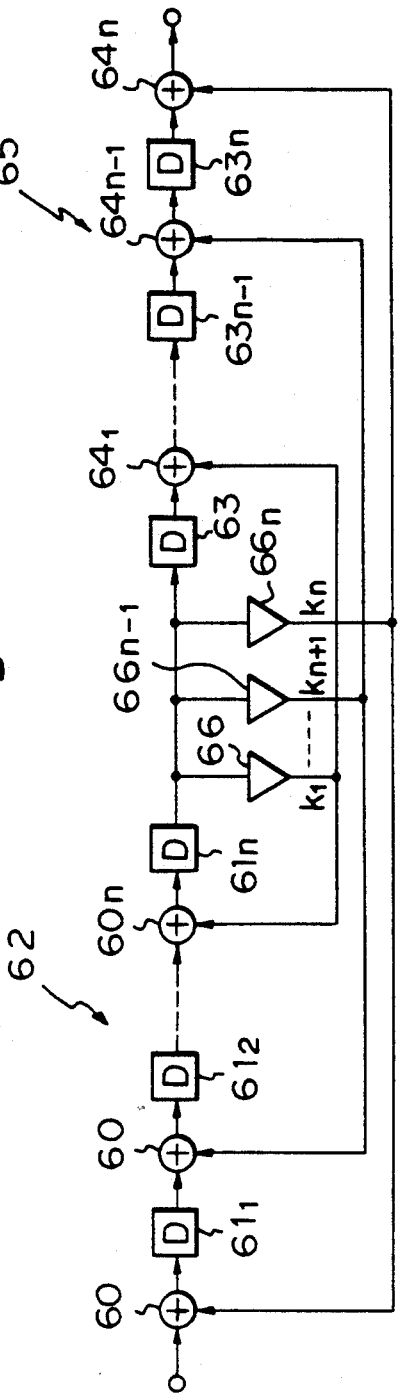
FIG. 14 is a block diagram showing another embodiment of the APF circuit according to the present invention.

FIG. 14 shows the construction of the APF circuit in that case. This APF circuit includes a first concatenated circuit 62 having n adders $60_1$ through $60_n$ and n delay elements $61_1$ through $61_n$ which are concatenated alternately in this order, a second concatenated circuit 65 concatenated with the first concatenated circuit 62, which has n delay elements $63_1$ through $63_n$ and n adders $64_1$ through $64_n$ concatenated alternately in this order, and n multiplying circuits $66_1$ through $66_n$ whose input terminals are connected to the common connection point of the first and second concatenated circuits 62 and 65. Pairs of adders ($60_n$ and $64_1$, . . . $60_2$ and $64_{n-1}$, and $60_1$ and $64_n$) are formed with adders of the first and second concatenated circuits 62 and 65 which are located symmetrically with respect to the common connection point, and output signals of the n multiplying circuits $66_1$ through $66_n$ are inputted to each pair of two adders.

The circuit constructed as above forms an n-th order all pass filter, in which the coefficients of the denominator and the numerator are always equal to each other and vary synchronously. Therefore, its amplitude characteristic is always equal to 1 and any operation between delay elements is at most one multiplication and one addition, so that the circuit can operate at a high clock frequency. In practice, however, the number n can not be excessively large because the coefficient sensitivity of the multiplication circuits becomes high.

In the case of the example described above, it is assumed that the FM video signal is converted by the A/D conversion and the processes after the conversion are all performed digitally. However, this is not limitative and it is apparent that the present invention can be applied in the case where an analog video signal as an input signal is converted by the A/D conversion and the processes thereafter are performed in digital form.

As explained so far, the time base correction apparatus according to the third aspect of the present invention is configured such that the writing clock signal following the time base error of the video signal is generated by a PLL circuit, and the video signal sampled with the writing clock signal is supplied to the variable delay device, and the delay time of the variable delay device is controlled by the phase error signal of the PLL circuit so that the residual time base error of the time base correction operation of the PLL circuit is canceled, and the output of the variable delay device is written into a buffer memory by using the writing clock signal, and in turn read out from the buffer memory by using a stable reference clock signal. Therefore, a more powerful time base correction is performed as compared with the case in which the time base correction is performed by using only the PLL circuit, and a video signal suited for the digital process is obtained by the sampling operation using the stable reference clock.

In addition, since all of the processes are performed in digital form, the time base correction is performed accurately by using the phase error signal of the color burst signal which is obtained accurately by digital operations. This also means that stable operation of the circuit is realized and the circuit is formed easily by using an integrated circuit.

Furthermore, since the video signal as a whole can be written in the buffer memory, it is not necessary to add the sync signal or the color burst signal on the reading side.

Figure 12:
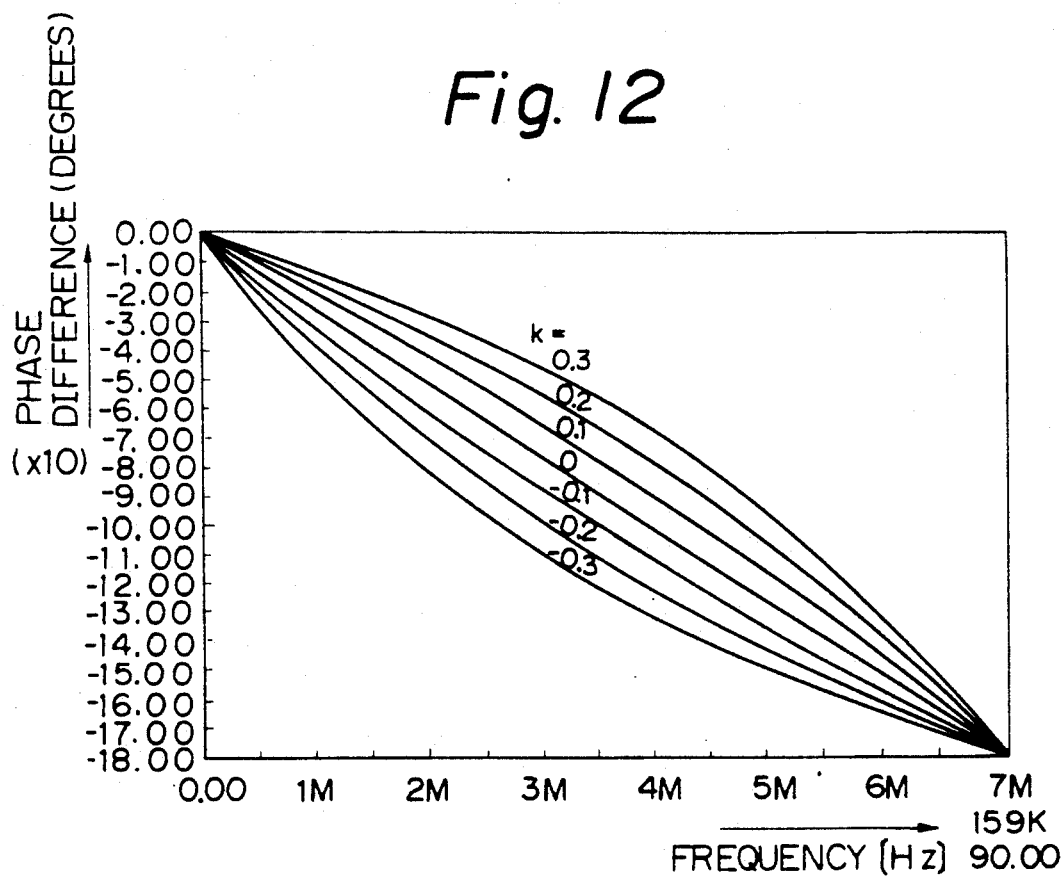
FIG. 12 is a diagram showing a phase characteristic of the circuit shown in FIG. 8.

In addition, FIG. 12 shows another example of the phase characteristic of the APF when the multiplication coefficient k is varied.

The explanation of the present invention will be further given in relation to the fourth feature of the invention.

The transfer function H(z) of the n-th order APF circuit shown in FIG. 14 is given as follows.

$$H(z) = \{Z^{-n} + k_1 Z^{-(n-1)} + \ldots \ldots + k_{n-1} + k_n\} / \{1 +$$

$$k_1 Z^{-1} + \ldots \ldots + k_{n-1} Z^{-(n-1)} + k_n Z^{-n}\}$$

If all of the multiplication coefficient are made equal to 0 in the n-th order APF, then the transfer function becomes $Z^{-n}$, and the delay time becomes the time of n samplings in the whole frequency range as in the case of the first order APF. Therefore, it is sufficient to vary all of the multiplying coefficients both in the positive and negative directions about 0 as a central value. However, it is sufficient that the delay time is equal to the time of an integral number of samplings only at fsc instead of the whole frequency range, as far as the sinuosity of the group delay characteristic is small. Therefore, the it is unnecessary to change all of the multiplying coefficients in the manner mentioned above. Some of the coefficient values can be set at a constant value and it is sufficient to vary other remaining coefficients both in positive and negative directions about the central value of 0. For instance, if the sampling frequency and the value n are set 4 fsc and 2 (n=2) respectively and the delay time is controlled by varying $k_1$ about 0 while fixing $k_2$, the transfer function when $k_1=0$ is given by the following equation. Since $Z^{-2}=-1$ at the frequency of fsc, the delay time becomes the period of 2 samplings.

$$H(z) = Z^{-2} + k_2/1 + k_2 Z^{-2}$$

$$H(-1) = k_2 - 1/1 - k_2 \text{ (at fsc)}$$

In this case, the sampling phase relative to the color burst signal is the same as that in the previous embodiment, and the advantageous feature of the present invention is retained.

Of course, the circuit construction of the APF is not limited to the arrangements shown in FIGS. 8 and 14, and any arbitrary arrangement can be used so far as the transfer characteristic of the APF is realized.

Also in the case of the example described above, it is assumed that the FM video signal is converted by the A/D conversion and the processes after the conversion are all performed digitally. However, this is not limitative and it is apparent that the present invention can be applied in the case where an analog video signal as an input signal is converted by the A/D conversion and the processes thereafter are performed in digital form.

As explained above, the time base correction apparatus according to the fourth aspect of the present invention is configured that a delay time of a variable delay device, which receives a video signal sampled by a clock having a frequency of a multiple of the color subcarrier frequency fsc by a factor of an integer, is controlled in both positive and negative directions about a central value of delay time corresponding to an integral number of samplings at least at the frequency fsc. Therefore, the average sampling phase with respect to the color burst signal does not change between the output signal and the input signal. Therefore, the advantage that the demodulation of the color signal by digital processing is performed easily, is retained even if the time base correction operation by this variable delay device and the time base correction operation by the PLL circuit are effected at the same time.

Moreover, since the delay time of the variable delay device is changed without shifting the sampling clock, the time base correction operation of this device can be effected simultaneously with the time base correction operation using the PLL circuit. Thus, more forcible time base correction can be performed as compared with the case in which only the time base control by the PLL circuit is effected, while the video signal is sampled by a more stable reference clock. In this way, a video signal suited for digital processing can be produced.

Furthermore, since the time base correction apparatus according to the present invention can be built in a video signal reproducing system in which all of the processes are performed in digital form, the time base correction is performed accurately by using the phase error signal of the color burst signal which is obtained accurately by digital operations. This means that the video signal as a whole can be written in the buffer memory, and it is not necessary to add the sync signal or the color burst signal on the reading side. Furthermore, stable operation of the circuit is realized and the circuit is formed easily by using an integrated circuit.

What is claimed is:

1. A time base correcting apparatus for correcting a time base error of an input signal, said time base error including a first time base error component in a first frequency range and a second time base error component in a second different frequency range, said apparatus comprising:

feedback loop means, receiving said input signal, for performing a first time base correction of said input signal by removing said first time base error component and producing a phase controlled output signal including said second time base error component and for detecting said second time base error component of said input signal;

filter means, connected to said feedback loop means, having an amplitude characteristic approximating an open loop characteristic of said feedback loop means, for receiving said second time base error component as a control signal and producing a filter output signal; and means for performing a second time base correction of said phase controlled output signal from said feedback loop means to remove said second time base error component, by a feed forward operation using said filter output signal of said filter means, to produce a corrected output signal.

2. A time base correction apparatus as set forth in claim 1, wherein said amplitude characteristic of said filter means becomes almost 1 in a low frequency range of said time base error.

3. A time base correction apparatus as set forth in claim 2, wherein said filter means has a transfer function expressed by a product between $(1+Z^{-1})/2$ and a hold function, in which $Z^{-1}$ represents a delay amount of said input signal.

4. A time base correction apparatus as set forth in claim 1, wherein said filter means and said means for performing said second time base correction together constitute variable delay means for delaying said phase controlled output signal of said feedback loop means.

5. The apparatus as in claim 1, wherein:

said filter means produces said filter output signal with a given delay time; and said means for performing said second time base correction comprises an input circuit for receiving said phase controlled output signal from said feedback loop means, said input circuit comprising delay means for delaying said phase controlled output signal by a time period corresponding to said given delay time of said filter means.

6. The apparatus as in claim 5, wherein:

said input signal is an input video signal; and said input circuit of said means for performing said second time base correction further comprises a drop-out correction circuit for performing drop-out correction of said phase controlled output signal from said feedback loop means, said drop-out correction circuit including said delay means of said input circuit.

7. The apparatus as in claim 5, wherein:
said given delay time of said filter means is as long as a multiple of a horizontal scanning period for said video signal by a factor of an integer.

8. The apparatus as in claim 5, wherein:
said filter means has a transfer function expressed by a product between $(1+Z^{-1})/2$ and a hold function, in which $Z^{+1}$ represents a signal delay time.

9. An apparatus as in claim 1, wherein:
said input signal is an input video signal;
said phase controlled output signal is a phase controlled video output signal; and
said corrected output signal is a corrected video output signal;
said feedback loop means producing a detection signal from said time base error and said feedback loop means comprising writing clock generating means for, on the basic of said detection signal, generating a writing clock signal following said time base error;
said means for performing said second time base correction comprising variable delay means for receiving said phase controlled video output signal and for delaying said phase controlled video output signal by a time period determined by said detection signal to produce said corrected video output signal; and
said means for performing said second time base correction further comprising an output circuit comprising a memory for storing said corrected video output by using said writing clock signal and reading clock generating means for generating a stable reading clock signal independent of said time base error for reading said corrected video output signal out of said memory.

10. An apparatus as in claim 9, wherein:
said input video signal is an input digital video signal;
said feedback loop means further comprising means for sampling said input digital video signal with said writing clock signal; and
said variable delay means of said means for performing said second time base correction comprising a digital all pass filter having a variable coefficient value and a delay time controlled by said coefficient value.

11. An apparatus as in claim 10, wherein:
said digital all pass filter comprises a first concatenated circuit in which n (n is a natural number) adders and n delay elements are concatenated alternately in order, and
a second concatenated circuit connected in series with said first concatenated circuit, in which n delay elements and n adders are concatenated alternately in order, and n adders, each of said adders having an input terminal connected to a common connection point of said first and second concatenated circuits, and wherein pairs of adders are formed by adders of said first and second concatenated circuits located symmetrically with respect to said common connection point and each output of said n adders is connected to two adders of each pair.

12. An apparatus as in claim 1, wherein:
said input signal comprises a sampled video signal sampled using a clock signal having a frequency which is a multiple of a color subcarrier frequency by a factor of an integer and containing said time base error; and
said phase controlled output signal is a phase controlled video output signal;
said feedback loop means comprises time base error detecting means for detecting said time base error of said sampled video signal; and
said means for performing a second time base correction comprises
variable delay means for delaying said phase controlled video output signal by a variable delay time, and
delay time control mean for controlling said delay time of said variable delay means in response to said time base error, to correct said time base error of said controlled video signal, wherein said delay time of said variable delay means is controlled within a range covering less than one sampling period in positive and negative directions about a delay time corresponding to an integral number of samplings at least at said color subcarrier frequency.

13. An apparatus as in claim 12, wherein:
said variable delay means is a digital all pass filter having a variable delay characteristic with a constant amplitude characteristic, and said delay time of said variable delay means is varied by changes in value of one or plural coefficients of said digital all pass filter in both positive and negative directions about a central value of 0.

* * * * *